US007216986B2

(12) United States Patent
Ikeda et al.

(10) Patent No.: US 7,216,986 B2
(45) Date of Patent: May 15, 2007

(54) COLOR SEPARATING AND MIXING ELEMENT, VIDEO LIGHT PRODUCING DEVICE, AND PROJECTION TYPE VIDEO DISPLAY

(75) Inventors: Takashi Ikeda, Osaka (JP); Yoshitaka Kurosaka, Hyogo (JP); Koji Ishii, Osaka (JP); Hideyuki Kanayama, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/809,477

(22) Filed: Mar. 26, 2004

(65) Prior Publication Data

US 2004/0189949 A1   Sep. 30, 2004

(30) Foreign Application Priority Data

Mar. 27, 2003  (JP) .............................. 2003-088054

(51) Int. Cl.
*G03B 21/28* (2006.01)
*G02B 5/04* (2006.01)

(52) U.S. Cl. ........................... 353/33; 353/81; 353/20; 349/62; 348/800; 348/752; 359/496

(58) Field of Classification Search .................. 353/20, 353/31, 33, 81, 94; 359/488, 495–500, 831, 359/833, 834; 349/8, 9, 62; 348/800, 752
See application file for complete search history.

(56) References Cited

U.S. PATENT DOCUMENTS 5,903,388 A * 5/1999 Sedlmayr .................... 359/497

6,042,234 A * 3/2000 Itoh ............................ 353/20
2003/0011752 A1* 1/2003 Ikeda et al. .................. 353/31
2003/0160859 A1* 8/2003 Roddy et al. ............... 347/239
2004/0227899 A1* 11/2004 Kurosaka et al. ............. 353/30

FOREIGN PATENT DOCUMENTS

JP      2002-162520      6/2002
WO   WO 2004/068197 A1   8/2004

OTHER PUBLICATIONS

Translation of WO 2004/068197 A1 to Okuhara, Kuninori 12, Aug. 2004, translated on May 2006 by the McElroy Translation Company.*

* cited by examiner

*Primary Examiner*—W. B. Perkey
*Assistant Examiner*—Andrew Sever
(74) *Attorney, Agent, or Firm*—McDermott Will & Emery LLP

(57) ABSTRACT

A color separating and mixing element comprises, in its transparent cube, a first optical function surface formed on a dividing surface for dividing the cube into two triangular prisms and a second optical function surface formed on another dividing surface. The first optical function surface has the function of transmitting both P-polarized light and S-polarized light with respect to red light, has the function of transmitting both P-polarized light and S-polarized light with respect to green light, and has the function of transmitting P-polarized light and reflecting S-polarized light with respect to blue light. The second optical function surface has the function of transmitting P-polarized light and reflecting S-polarized light with respect to red light, has the function of transmitting P-polarized light and reflecting S-polarized light with respect to green light, and has the function of transmitting both P-polarized light and S-polarized light with respect to blue light.

42 Claims, 11 Drawing Sheets

(a)

| | P-POLARIZED LIGHT | S-POLARIZED LIGHT |
|---|---|---|
| R | TRANSMIT | TRANSMIT |
| G | TRANSMIT | TRANSMIT |
| B | TRANSMIT | REFLECT |

(b)

| | P-POLARIZED LIGHT | S-POLARIZED LIGHT |
|---|---|---|
| R | TRANSMIT | REFLECT |
| G | TRANSMIT | REFLECT |
| B | TRANSMIT | TRANSMIT |

COLOR SEPARATING AND MIXING ELEMENT, VIDEO LIGHT PRODUCING DEVICE, AND PROJECTION TYPE VIDEO DISPLAY

BACKGROUND OF THE INVENTION

Field of the Invention

The present invention relates to a color separating and mixing element in a cubic shape, a video light producing device comprising the color separating and mixing element, and a projection type video display comprising the video light producing device.

FIG. 12 is a perspective view showing a liquid crystal projector using a color separating and mixing element 120 in a cubic shape. The liquid crystal projector is disclosed in Japanese Patent Application (JP-A-2002-162520) by the applicant of the present invention. The color separating and mixing element 120 comprises a light incidence surface opposed to a light source 110, three light output/incidence surfaces respectively opposed to reflection type liquid crystal display panels 131, 132, and 133, a light output surface opposed to a projection optical system 140, and another surface. The color separating and mixing element 120 comprises in its inner part a color separating and mixing sector 150 for separating light incident from the light source 110 into the three primary colors and emitting the color lights from the predetermined light output/incidence surfaces. The emitted color lights are respectively reflected by the reflection type liquid crystal display panels 131, 132, and 133 arranged opposite to the light output/incidence surfaces. Each of the reflected color lights is returned to the color separating and mixing element 120 after the direction of polarization thereof is rotated by 90°. The color separating and mixing sector 150 further mixes (synthesizes) the color lights in the three primary colors which have been returned to the color separating and mixing element 120. Light obtained by the mixing (color video light) is given to the projection optical system 140 from the light output surface.

The color separating and mixing sector 150 is formed of a dielectric multilayer film (membrane), for example, and comprises three optical surfaces 151, 152, and 153, as respectively shown in FIGS. 13, 14, and 15. Red light is transmitted by the optical surface 151, reflected by the liquid crystal display panel for red color 131 and returned, and is reflected by the optical surface 151 and emitted from the light output surface. Green light is reflected by the optical surface 151, reflected by the liquid crystal display panel for green color 132 and returned, and is transmitted by the optical surface 151 and emitted from the light output surface. Blue light is reflected by the optical surface 152, reflected by the liquid crystal display panel for blue color 133 and returned, and is reflected by the optical surface 153 and emitted from the light output surface.

Since the color separating and mixing element 120 has the three optical surfaces 151, 152, and 153 formed in its cubic shape, however, it comprises a combination of six tetrahedrons. Consequently, the color separating and mixing element 120 has the disadvantages of being difficult to manufacture and of being reduced in contrast by an optical surface which reflects video light so as to twist the video light.

SUMMARY OF THE INVENTION

In view of the foregoing circumstances, an object of the present invention is to provide a color separating and mixing element which is simple in configuration and is not easily reduced in contrast.

Another object of the present invention is to provide a video light producing device capable of preventing a double image from being produced, and a projection type video display using the same.

In order to solve the above-mentioned problem, a color separating and mixing element according to the present invention is characterized by comprising, in its transparent cube, a first optical function surface formed on a two-dividing surface for dividing the cube into two triangular prisms and a second optical function surface formed on another two-dividing surface, the first optical function surface having the functions of transmitting both first polarized light and second polarized light which differs from the first polarized light by 90° in the direction of polarization with respect to two of lights in the three primary colors and transmitting first polarized light and reflecting second polarized light with respect to the other one light in the primary color, and the second optical function surface having the functions of transmitting both first polarized light and second polarized light with respect to the other one light in the primary color and transmitting first polarized light and reflecting second polarized light with respect to the two lights in the primary colors.

In the above-mentioned configuration, the two optical function surfaces are formed in a cubic shape, which is a simple configuration comprising a combination of four optical parts. Therefore, the manufacture thereof is easier than that of a conventional configuration comprising six tetrahedrons, and an optical function surface for reflecting video light so as to twist the video light is eliminated, thereby making it possible to also avoid a reduction in contrast.

A color separating and mixing element according to the present invention is characterized by comprising, in its transparent cube, a first optical function surface and a second optical function surface which are unparallel to each other, first and second faces of the cube being respectively taken as light incidence surfaces, third, fourth and fifth faces of the cube being respectively taken as light incidence/output surfaces, and a sixth face of the cube being taken as a light output surface, one light in the primary color which is predetermined polarized light incident on the first face of the cube passing through the first optical function surface and being emitted from the third face of the cube, the one light in the primary color returned after the direction of polarization thereof is rotated by 90° being received in the third face of the cube, the one light in the primary color being reflected by the first optical function surface and being emitted from the light output surface, one, which is predetermined polarized light, of two lights in the primary colors incident on the second face of the cube passing through the second optical function surface and being emitted from the fourth face of the cube, the one light in the primary color returned after the direction of polarization thereof is rotated by 90° being received in the fourth face of the cube, the one light in the primary color being reflected by the second optical function surface and being emitted from the light output surface, and the other one, which is predetermined polarized light, of the two lights in the primary colors incident on the second face of the cube being reflected by the second optical function surface and being emitted from the fifth face of the cube, the other one light in the primary color returned after the direction of polarization thereof is rotated by 90° being received in the fifth face of the cube, and the other one light in the primary color passing through the second optical function surface and being emitted from the light output surface.

In the above-mentioned configuration, the two optical function surfaces are formed in the cube, which is a simple configuration comprising a combination of four optical parts. Therefore, the manufacture thereof is easier than that of a conventional configuration comprising six tetrahedrons, and an optical function surface for reflecting video light so as to twist the video light is eliminated, thereby making it possible to also avoid a reduction in contrast.

A video light producing device according to the present invention is characterized by comprising the above-mentioned color separating and mixing element; three reflection type light modulating elements respectively provided on the side of the third, fourth and fifth faces of the cube of the color separating and mixing element; a light source for emitting white light; separation means for separating the white light emitted from the light source into one light in the primary color and two lights in the primary colors which are predetermined polarized lights; and narrow-band retardation means for rotating the direction of polarization of one of the two lights in the primary colors by 90°.

A video light producing device according to the present invention is characterized by comprising the above-mentioned color separating and mixing element; three reflection type light modulating elements respectively provided on the side of the third, fourth and fifth faces of the cube of the color separating and mixing element; a first light source portion for emitting one light in the primary color which is predetermined polarized light; and a second light source portion for emitting two lights in the primary colors which differ from each other by 90° in the direction of polarization.

In such a configuration, the second light source portion may comprise narrow-band retardation means for rotating the direction of polarization of one of the two lights in the primary colors by 90°.

The second light source portion may comprise two light sources for respectively emitting two lights in the primary colors which differ from each other by 90° in the direction of polarization, and mixing means for receiving and mixing the two lights in the primary colors.

In the above-mentioned video light producing device, the light source or the light source portion may comprise solid-state light emission means.

The video light producing device may comprise polarization conversion means for converting the direction of polarization of the incident light.

The video light producing device may be so configured that the light from the light source is changed into two light fluxes, and the two light fluxes cross each other on the optical function surface and are respectively introduced into a first irradiation area and a second irradiation area of the predetermined reflection type light modulating element. Consequently, a double image can be prevented from being produced.

In such a configuration, the video light producing device may comprise a first integrator lens comprising an incidence-side lens array and an output-side lens array such that each of convex lenses introduces the light from the light source into the first irradiation area of the reflection type light modulating element, and a second integrator lens comprising an incidence-side lens array and an output-side lens array such that each of convex lenses introduces the light from the light source into the second irradiation area of the reflection type light modulating element.

The video light producing device may comprise a mechanism for adjusting the angle of irradiation of the light flux.

The video light producing device may comprise a mechanism for shifting the position where the irradiation of the light flux is started.

The video light producing device may be so configured that condenser lenses are respectively provided on the light output side of the output-side lens arrays, and each of the condenser lenses is provided such that the movement thereof is adjustable in a direction perpendicular to its optical axis so that the angle of irradiation of the light flux can be adjusted.

The video light producing device may be so configured that condenser lenses are respectively provided on the light output side of the output-side lens arrays, to form pairs of integrator lenses and corresponding condenser lenses, and the pairs are provided such that the positions thereof can be individually shifted so that an operation for shifting the position where the irradiation of the light flux is started can be performed.

The above-mentioned two integrator lenses for changing the light into the two light fluxes may be replaced with two rod integrators.

In such a configuration, the video light producing device may be so configured that there is provided a light source comprising a reflector in the shape of a curved surface, and approximately parallel lights from the light source are condensed, and are respectively introduced into light incidence surfaces of the two rod integrators.

The video light producing device may be so configured that there is provided a light source comprising a reflector for forming two light converging points from one light emitting point, and light incidence surfaces of the two rod integrators are respectively arranged in the vicinity of the positions of the two light converging points of the light source.

The video light producing device may be so configured that there are provided two light sources, and lights from the light sources are respectively introduced into light incidence surfaces of the two rod integrators.

In the above-mentioned configuration using the two rod integrators, the video light producing device may be so configured that a single optical element is provided at a position on the light incidence side of the color separating and mixing element, and the two light fluxes which arrive in a crossing shape are refracted by the optical element.

An optical system arranged on the light output side in each of the two rod integrators may comprise at least a first optical element for condensing light emitted from the rod integrator and a second optical element arranged in the vicinity of a light converging point of the first optical element.

Furthermore, in this configuration, the video light producing device may be so configured that the two rod integrators are arranged parallel to each other, and the optical system comprises a third optical element for refracting lights passing through the second optical element and making the refracted lights cross each other.

Alternatively, the video light producing device may be so configured that the two rod integrators are arranged unparallel to each other, and lights passing through the second optical element cross each other.

In the above-mentioned video light producing device, letting A:B be an aspect ratio in the reflection type light modulating element, each of the first irradiation area and the second irradiation area may be divided at a ratio of A:B/2.

In the video light producing device, the light source, the color separating and mixing element, and the optical element leading to the color separating and mixing element from the light source may be unitized.

A projection type video display according to the present invention is characterized by comprising any one of the above-mentioned video light producing devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A color separating and mixing element according to an embodiment of the present invention will be described on the basis of FIGS. 1 and 2.

Figure 1:
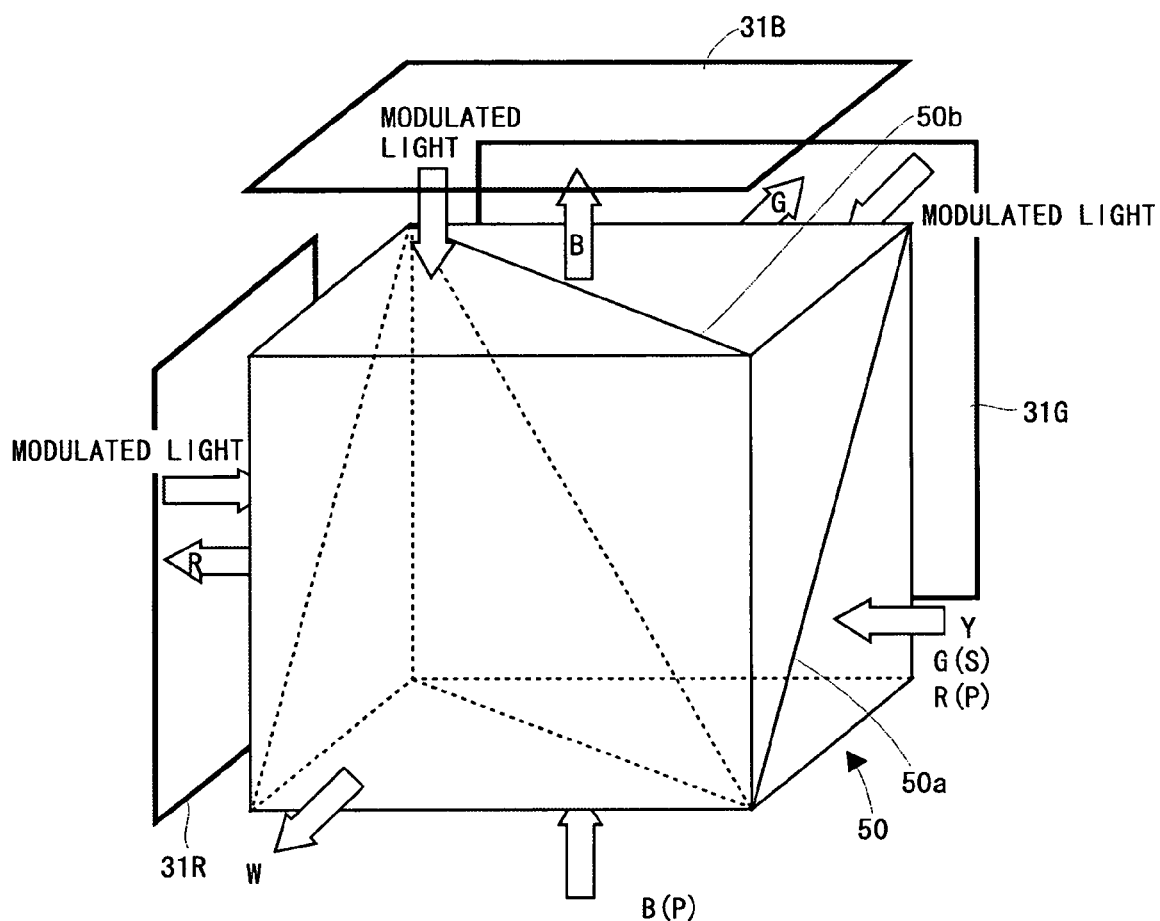
FIG. 1 is an explanatory view showing the arrangement relationship between a color separating and mixing element and a reflection type light modulating element, for example, in an embodiment of the present invention.
Figure 2:
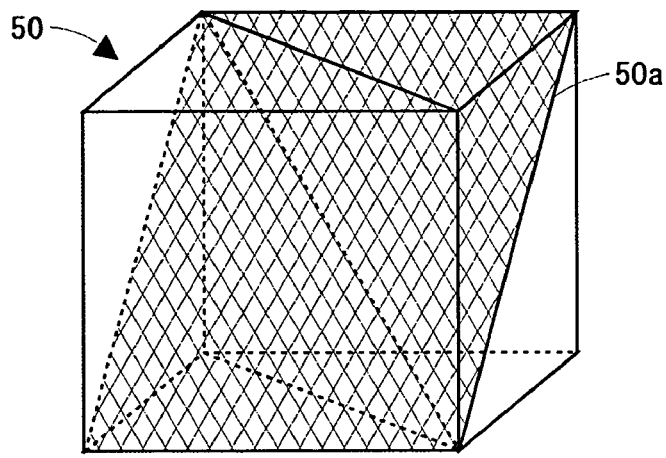
FIG. 2, consisting of FIGS. 2(a) and 2(b), is an explanatory view for explaining an optical function surface in the color separating and mixing element shown in FIG. 1.
Figure 2:
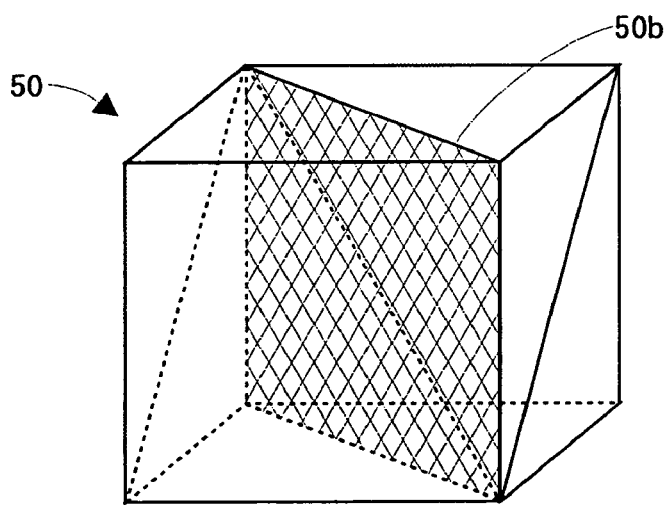

As shown in FIG. 1, a color separating and mixing element 50 comprises, in its transparent glass cube, a first optical function surface 50a composed of a multilayer dielectric film or the like formed on a dividing surface for dividing the cube into two triangular prisms, and a second optical function surface 50b composed of a multilayer dielectric film or the like formed on another dividing surface. For example, the first optical function surface 50a is arranged so as to connect an upper side on the innermost side of the transparent cube and a lower side on the front side thereof to each other, as shown in FIG. 2(a). The first optical function surface 50a has the function of transmitting both P-polarized light and S-polarized light with respect to red light, has the function of transmitting both P-polarized light and S-polarized light with respect to green light, and has the function of transmitting P-polarized light and reflecting S-polarized light with respect to blue light. On the other hand, the second optical function surface 50b is arranged so as to connect a longitudinal side on the left innermost side of the transparent cube and a longitudinal side on the right front side thereof to each other, as shown in FIG. 2(b). The second optical function surface 50b has the function of transmitting P-polarized light and reflecting S-polarized light with respect to red light, has the function of transmitting P-polarized light and reflecting S-polarized light with respect to green light, and has the function of transmitting both P-polarized light and S-polarized light with respect to blue light.

In FIG. 1, the color separating and mixing element 50 respectively takes a first face (bottom face in the drawing) and a second face (right face) of the cube as light incidence surfaces, respectively takes a third face (top face), a fourth face (left face), and a fifth face (innermost face) of the cube as surfaces opposite to three reflection type liquid crystal display panels 31, and takes a sixth face (front face) of the cube as a light output surface.

The reflection type liquid crystal display panel for blue color 31B is arranged opposite to the third face (top face) of the cube. The reflection type liquid crystal display panel is so configured that a pixel in its portion to be displayed rotates the direction of polarization of incident light (illuminating light) by 90° and reflects (modulates) the rotated incident light. Blue light which is P-polarized light is incident on the first face (bottom face) of the cube. The incident blue light which is P-polarized light passes through the first optical function surface 50a to lead to the reflection type liquid crystal display panel 31B, and is reflected after being changed into modulated blue light which is S-polarized light after the direction of polarization thereof is rotated by 90° by the reflection type liquid crystal display panel 31B. The modulated blue light which is S-polarized light is reflected by the first optical function surface 50a, and is emitted from the light output surface.

The reflection type liquid crystal display panel for red color 31R is arranged opposite to the fourth face (left face) of the cube, and the reflection type liquid crystal display panel for green color 31G is arranged opposite to the fifth face (innermost face) of the cube. Yellow light (Red light which is P-polarized light and green light which is S-polarized light) is incident on the second face (right face) of the cube.

The red light which is P-polarized light of the incident yellow light which is P-polarized light passes through the second optical function surface 50b to lead to the reflection type liquid crystal display panel for red color 31R, and is reflected after being changed into modulated red light which is S-polarized light after the direction of polarization thereof is rotated by 90° by the reflection type liquid crystal display panel 31R. The modulated red light which is S-polarized light is reflected by the second optical function surface 50b, and is emitted from the light output surface. The green light which is S-polarized light is reflected by the second optical function surface 50b to lead to the reflection type liquid crystal display panel for green color 31G, and is reflected after being changed into modulated green light which is P-polarized light after the direction of polarization thereof is rotated by 90° by the reflection type liquid crystal display panel 31G. The modulated green light which is P-polarized light passes through the second optical function surface 50b, and is emitted from the light output surface.

Figure 3:
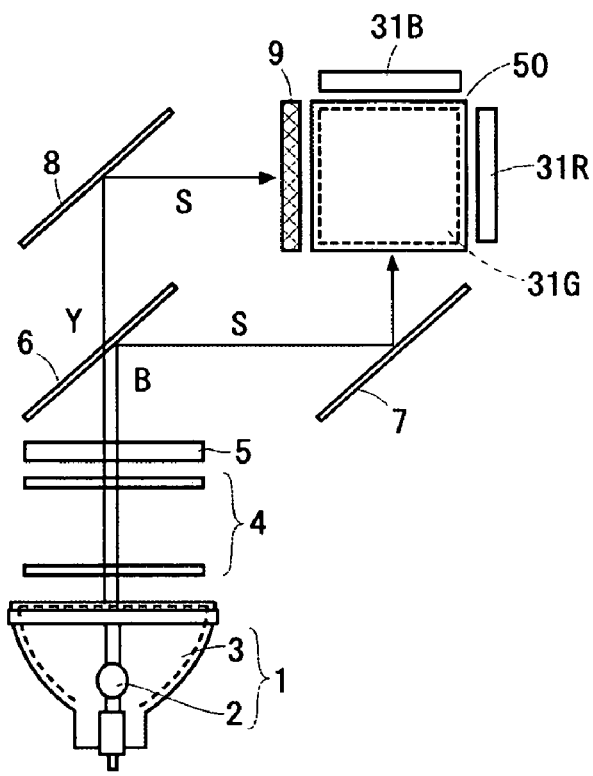
FIG. 3 is an explanatory view showing an optical system for a projection type video display using the color separating and mixing element shown in FIG. 1.

FIG. 3 is an explanatory view showing an optical system for a liquid crystal projector comprising the above-mentioned color separating and mixing element 50. In FIG. 3, a reflection type liquid crystal display panel for green color 31G is arranged at the back of the color separating and mixing element 50, a surface at the front of the color separating and mixing element 50 is a light output surface, and a projection lens (not shown) is arranged on the light output surface.

A light emitter 2 in a light source 1 is composed of a ultra-high pressure mercury lamp, a metal halide lamp, a xenon lamp, or the like, and its irradiated light is emitted after being changed into parallel lights by a parabolic reflector 3, and is introduced into an integrator lens 4.

The integrator lens 4 is composed of pairs of lenses (a pair of fly's eye lenses), and each of the pairs of lenses introduces the light emitted from the light source 1 into the whole surface of the reflection type liquid crystal display panel 31. The light which has passed through the integrator lens 4 is introduced into a dichroic mirror 6 through a polarization conversion system 5.

The polarization conversion system 5 is composed of a polarizing beam splitter array (hereinafter referred to as a PBS array) The PBS array comprises a polarized light separating surface and a retardation plate (½λ plate). The polarized light separating surface in the PBS array passes P-polarized light and changes the optical path of S-polarized light by 90° in the light from the integrator lens 4. The S-polarized light whose optical path has been changed is reflected by an adjacent polarized light separating surface and is emitted. On the other hand, the P-polarized light which has passed through the polarized light separating surface is converted into S-polarized light by the retardation plate provided on the front side (on the light exit side) and is emitted. That is, almost all lights are converted into S-polarized lights.

The dichroic mirror 6 transmits yellow light (red light and green light), while reflecting blue light. The blue light reflected by the dichroic mirror 6 is reflected by a total reflection mirror 7 so that the optical path thereof is changed. The blue light which is P-polarized light reflected by the total reflection mirror 7 is incident on the first face of the cube of the color separating and mixing element 50.

On the other hand, the yellow light which has passed through the dichroic mirror 6 is reflected by a total reflection mirror 8, and is introduced into a narrow-band retardation plate 9. The narrow-band retardation plate 9 changes only the green light into P-polarized light by rotating the direction of polarization thereof by 90°. The narrow-band retardation plate 9 may be replaced with a combination of a dichroic mirror and a retardation plate. S (S-polarized light) in FIG. 3 is S-polarized light based on the polarization conversion system 5. On the other hand, each of P-polarized light and S-polarized light in FIG. 1 is P-polarized light and S-polarized light respectively based on the first optical function surface 50a and the second optical function surface 50b in the color separating and mixing element 50. The first optical function surface 50a and the second optical function surface 50b in FIG. 1 are directed toward the twisted direction by 90° with respect to the polarization conversion system 5, the dichroic mirror 6, and the total reflection mirror 7 and 8 in FIG. 3. Therefore, S-polarized light in FIG. 3 is P-polarized light for the color separating and mixing element 50.

Figure 4:
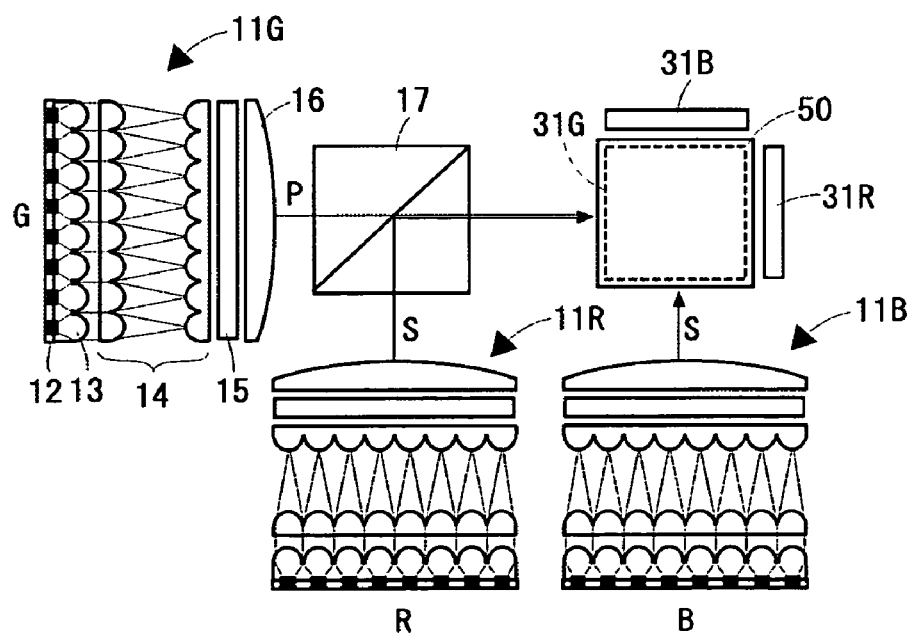
FIG. 4 is an explanatory view showing an optical system for a projection type video display using the color separating and mixing element shown in FIG. 1.

FIG. 4 is an explanatory view showing another optical system for a reflection type liquid crystal projector comprising the color separating and mixing element 50. In FIG. 4, a reflection type liquid crystal display panel for green color 31G is arranged at the back of the color separating and mixing element 50, a surface at the front of the color separating and mixing element 50 is a light output surface, and a projection lens (not shown) is arranged on the light output surface.

The liquid crystal projector comprises three illuminating devices 11R, 11G, and 11B (a reference numeral "11" is used when each of the illuminating devices is not specified). The illuminating device 11R emits red light, the illuminating device 11G emits green light, and the illuminating device 11B emits blue light. The illuminating devices 11R, 11G, and 11B differ in color of emitted light but are approximately the same in configuration. Therefore, only constituent elements in the illuminating device 11G are assigned reference numerals, and reference numerals to be assigned to constituent elements in the other illuminating devices 11R and 11B are omitted.

The illuminating device 11 comprises a light source having LED chips 12 arranged therein in an array shape and having lens cells 13 arranged therein on the light output side of the LED chips 12, and an integrator lens 14 for integrating (superimposing) lights emitted from the LED chips 12 and parallelized by the lens cells 13 and introducing the lights into the reflection type liquid crystal display panel 31. The integrator lens 14 is composed of pairs of lenses (a pair of fly's eye lenses), and each of the pairs of lenses introduces the light emitted from the corresponding LED chip 12 into the whole surface of the reflection type liquid crystal display panel 31. The lights emitted from the LED chips 12 are thus integrated and introduced into the reflection type liquid crystal display panel 31, thereby making it possible to prevent the intensity distribution of lights introduced onto the reflection type liquid crystal display panel 31 (onto a screen video) from being non-uniform.

A polarization conversion system 15 is provided between the integrator lens 14 and a condenser lens 16. Although the polarization conversion system 15 has the same configuration as that of the above-mentioned polarization conversion system 5, the emitted light is converted into P-polarized light in the illuminating device for green color 11G.

The illuminating devices 11R and 11G are arranged such that the optical axes of the respective emitted lights cross each other at an angle of 90°. A polarizing beam splitter 17 is provided at the above-mentioned crossing position. A light output surface of the polarizing beam splitter 17 is opposed to the yellow light incidence surface (the second face of the cube) in the color separating and mixing element 50. The red light which is S-polarized light emitted from the illuminating device 11R and the green light which is P-polarized light emitted from the illuminating device 11G are mixed by the polarizing beam splitter 17 to be yellow light, and the yellow light is incident on the yellow light incidence surface in the color separating and mixing element 50.

The illuminating device 11B is opposed to the blue light incidence surface (the first face of the cube) in the color separating and mixing element 50, and the blue light which is S-polarized light emitted from the illuminating device 11B is incident on the blue light incidence surface in the color separating and mixing element 50.

The polarizing beam splitter 17 can be also replaced with a wire grid having a configuration in which line-shaped members each having a width which is approximately equal to or less than the wavelength of object color light are arranged with spacing which is approximately equal to or less than the wavelength. A dichroic prism for mixing red light and green light may be used. Further, an illuminating device for emitting yellow light which is P-polarized light may be provided in place of the illuminating devices 11R and 11G, and a narrow-band retardation plate for changing only red light into S-polarized light may be further provided on the optical path of the yellow light. Each of P (P-polarized light) and S (S-polarized light) in FIG. 4 is P-polarized light and S-polarized light based on the polarizing beam splitter 17 (which may be the polarization conversion system 15). On the other hand, each of P-polarized light and S-polarized light in FIG. 1 is P-polarized light and S-polarized light respectively based on the first optical function surface 50a and the second optical function surface 50b in the color separating and mixing element 50. The first optical function surface 50a and the second optical function surface 50b in FIG. 1 are directed toward the twisted direction by 90° with respect to the polarization conversion system 15 in FIG. 4. Therefore, P-polarized light in FIG. 4 is S-polarized light for the color separating and mixing element 50, and S-polarized light in FIG. 4 is P-polarized light for the color separating and mixing element 50.

Figure 5:
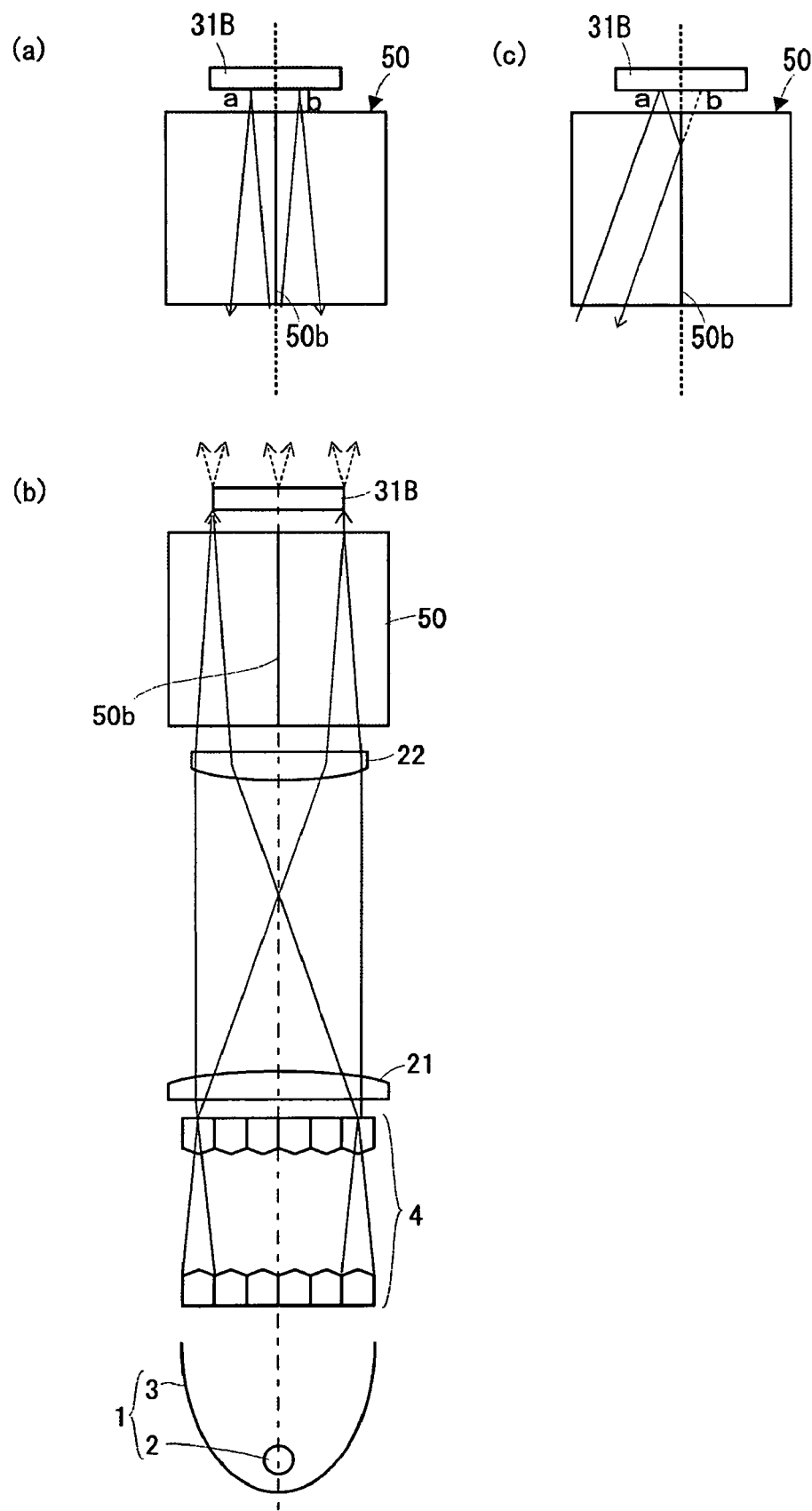
FIG. 5, consisting of FIGS. 5(a), 5(b), and 5(c), is an explanatory view for explaining an optical system for a projection type video display having a single-flux illuminating system as well as showing the disadvantages thereof.

FIGS. 5(a) and 5(b) are explanatory views showing the relationship between an illuminating system using an integrator lens 4 and a color separating and mixing element 50. The relationship occurs between blue light and a second optical function surface 50b and between yellow light and a first optical function surface 50a. FIG. 5(b) simply illustrates the relationship among a light source 1, the color separating and mixing element 50, and a reflection type liquid crystal display panel 31 (a retardation plate or the like is also omitted), and FIG. 5(a) illustrates the relationship between reflected light (modulated light) by the reflection type liquid crystal display panel 31B and the second optical function surface 50b in the color separating and mixing element Light incident on one of convex lenses composing an incidence-side lens array in the integrator lens 4 is focused in the vicinity of a corresponding convex lens in an output-side lens array, is refracted toward the center by condenser lenses 21 and 22, and is obliquely introduced into the liquid crystal display panel 31, and the light reflected by the liquid crystal display panel 31 is obliquely incident on the color separating and mixing element 50.

However, the second optical function surface 50b in the color separating and mixing element 50 is arranged parallel to the direction of light output/incidence of the liquid crystal display panel for blue color 31B, and reflects a part of modulated light reflected by the reflection type liquid crystal display panel for blue color 31B and obliquely incident thereon. As shown in FIG. 5(c), light which reaches the second optical function surface 50b after being reflected by the reflection type liquid crystal display panel 31B is totally reflected, and is focused at a corresponding position on a screen as if light modulated at a point a on the panel came from a point b on the panel. Further, as shown in FIG. 5(a), light which does not reach the optical function surface 50b after being reflected by the reflection type liquid crystal display panel 31B and is modulated as it is at the point b on the panel is focused at a corresponding position on the screen. Consequently, lights from two points, i.e., the points a and b on the panel are superimposed and focused at a position corresponding to the point b on the screen, thereby producing a double image.

Figure 6:
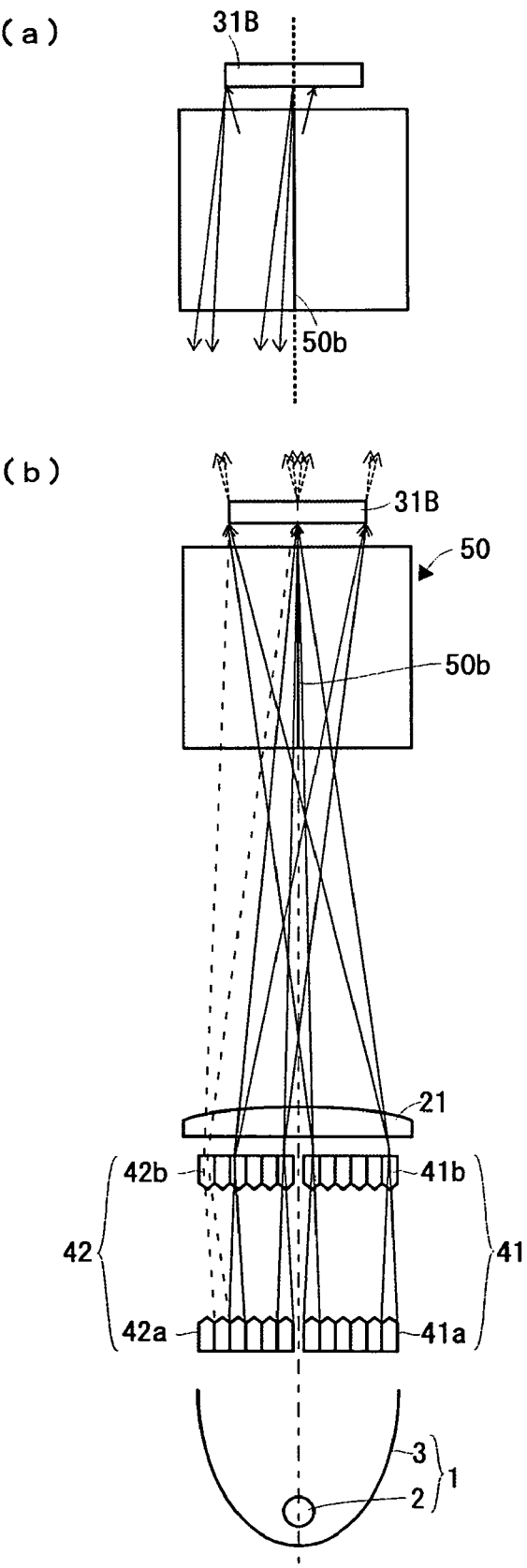
FIG. 6, consisting of FIGS. 6(a) and 6(b), is an explanatory view showing a two-fluxes illuminating system having two integrator lenses.
Figure 7:
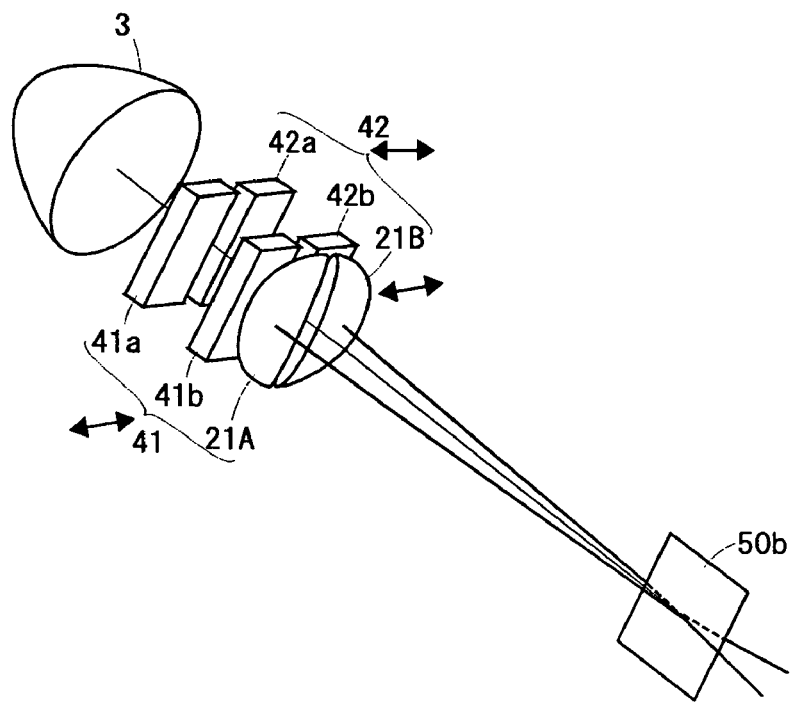
FIG. 7 is an explanatory view showing a modified example of the two-fluxes illuminating system shown in FIG. 6.
Figure 8:
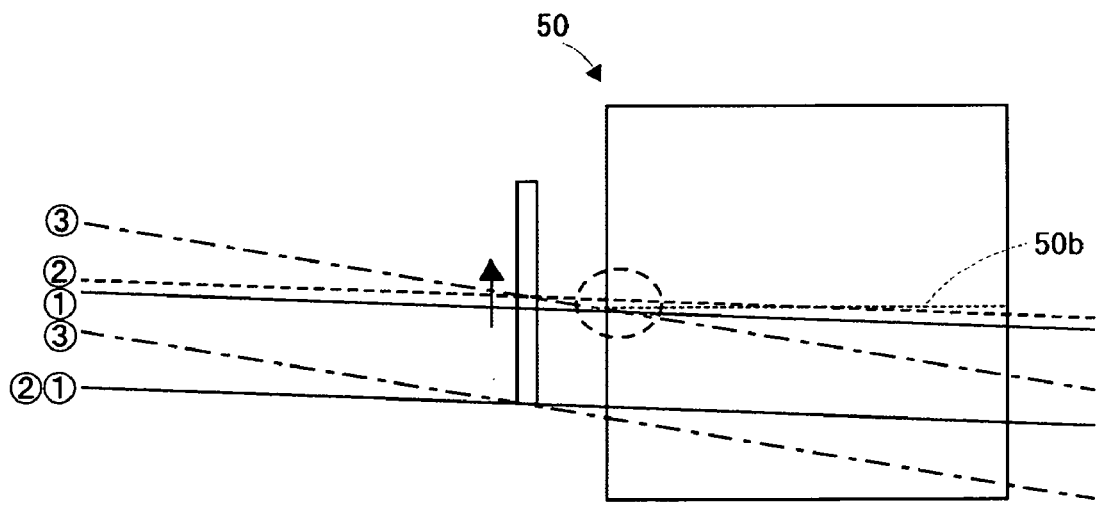
FIG. 8 is an explanatory view showing the function of FIG. 7.
Figure 9:
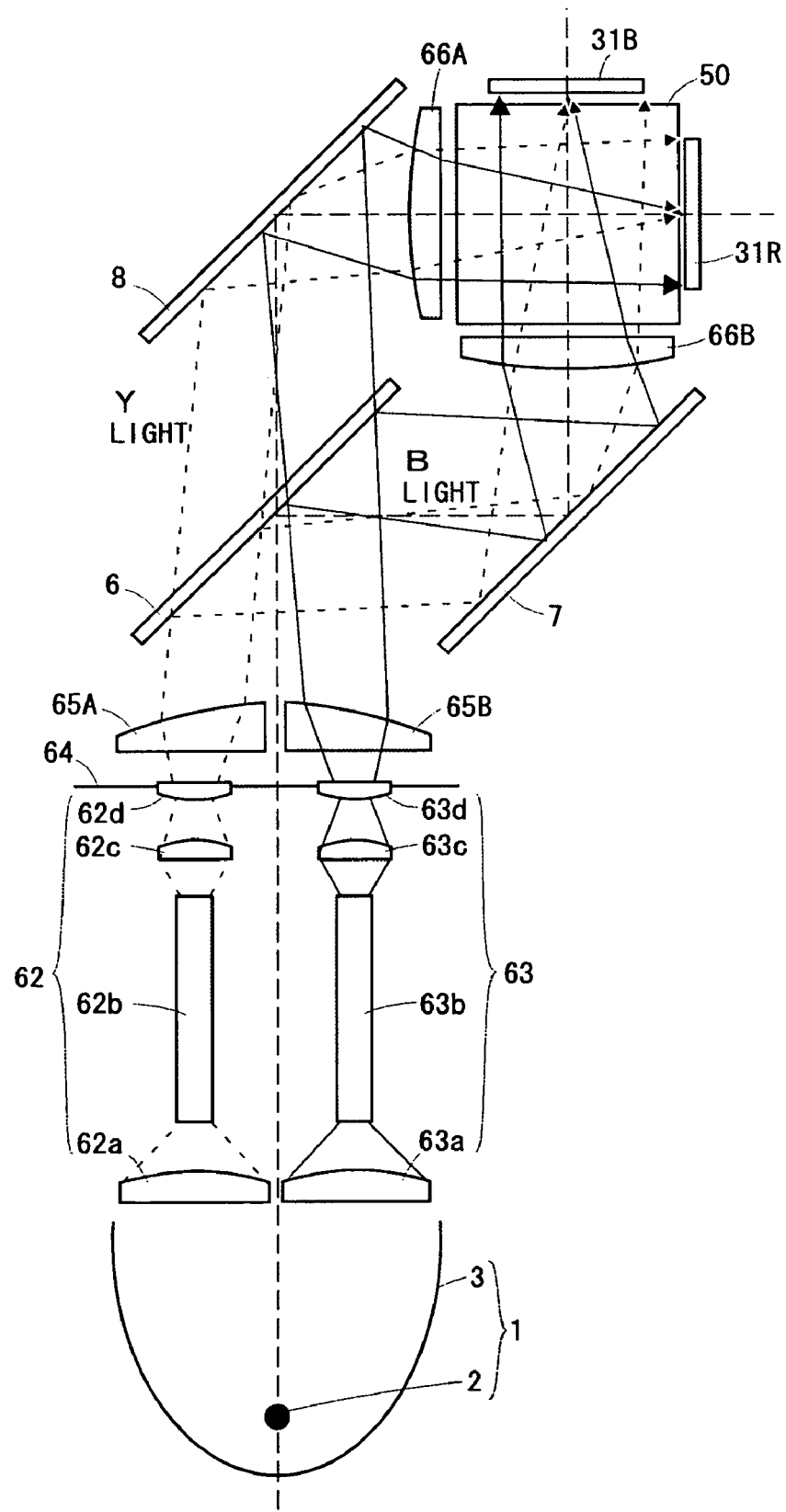
FIG. 9 is an explanatory view showing a two-fluxes illuminating system having two rod integrators.

An illuminating optical system capable of overcoming the disadvantages of such a double image will be then described on the basis of FIGS. 6 to 8. FIG. 6 is a perspective view showing the relationship between the second optical function surface 50b in the color separating and mixing element 50 and the reflection type liquid crystal display panel for blue color 31B, where the illustration of a color light separation optical system for yellow light and its optical guiding system is omitted. The color light separation optical system for yellow light and the optical guiding system are illustrated in FIG. 9.

In the present embodiment, each of the liquid crystal display panels 31 is obliquely arranged such that the center line thereof is parallel to the optical function surfaces 50a and 50b. The reflection type liquid crystal display panel 31 is divided into areas using as a boundary a horizontal center line (which can be also a vertical center line) thereof. One of the areas is taken as a first irradiation area, and the other area is taken as a second irradiation area. Letting A:B be an aspect ratio in the reflection type liquid crystal display panel 31, each of the first irradiation area and the second irradiation area is divided at a ratio of A:B/2. A first light flux from the light source 1 is introduced into the first irradiation area, and a second light flux from the light source 1 is introduced into the second irradiation area.

FIG. 6 is an explanatory view showing the outline of an optical system for a reflection type liquid crystal projector according to the present embodiment. FIG. 6(b) simply illustrates the relationship among a light source 1, a color separating and mixing element 50, and a reflection type liquid crystal display panel 31B (a retardation plate or the like is also omitted), and FIG. 6(a) illustrates the relationship between reflected light (modulated light) by a reflection type liquid crystal display panel 31B and a second optical function surface 50b in the color separating and mixing element 50.

A first integrator lens 41 and a second integrator lens 42 for averaging partial nonuniformity of luminance which exists in light are arranged on the light output side of the light source 1. A first light flux is produced by the first integrator lens 41, and a second light flux is produced by the second integrator lens 42.

The first integrator lens 41 comprises a pair of lens arrays (a pair of fly's eye lenses) 41a and 41b, and each of convex lenses (irrespective of whether the convex lens is directed toward the light incidence side or the light output side) composing each of the lens arrays irradiates the first irradiation area of the reflection type liquid crystal display panel 31B. That is, in the first integrator lens 41, light incident on one of the convex lenses composing the incidence-side lens array 41a is focused in the vicinity of the corresponding convex lens in the output-side lens array 41b, is refracted by a condenser lens 21, and is introduced into the reflection type liquid crystal display panel 31B in such a manner as to cross the second optical function surface 50*b* in the color separating and mixing element 50.

The second integrator lens 42 comprises a pair of lens arrays (a pair of fly's eye lenses) 42*a* and 42*b*, and each of convex lenses (irrespective of whether the convex lens is directed toward the light incidence side or the light output side) composing each of the lens arrays irradiates the second irradiation area of the reflection type liquid crystal display panel 31B. That is, in the second integrator lens 42, light incident on one of the convex lenses composing the incidence side lens array 42*a* is focused in the vicinity of the corresponding convex lens in the output-side lens array 42*b*, is refracted by the condenser lens 21, and is introduced into the reflection type liquid crystal display panel 31B in such a manner as to cross the second optical function surface 50*b* in the color separating and mixing element 50.

Light from the light source 1 is thus changed into two light fluxes by the first integrator lens 41 and the second integrator lens 42. The two light fluxes cross each other on the second optical function surface 50*b* in the color separating and mixing element 50, to be respectively introduced into the first irradiation area and the second irradiation area of the reflection type liquid crystal display panel 31B. The shapes of convex lens portions in the integrator lenses are respectively similar to the shapes of the first and second irradiation areas.

By such a configuration, reflected light modulated by the reflection type liquid crystal display panel 31B is reflected in a direction away from the second optical function surface 50*b* in the color separating and mixing element 50, not to cross the second optical function surface 50*b* in the color separating and mixing element 50. Accordingly, a double image is prevented from being formed by total reflection and transmission on the second optical function surface 50*b* in the color separating and mixing element 50. Although transmission and total reflection occur when the two light fluxes are incident on the second optical function surface 50*b*, total reflection on one surface of the optical function surface before being incident on the liquid crystal display panel is canceled by total reflection on the other surface, not to lead to imbalance in brightness between the first and second irradiation areas of the liquid crystal display panel.

Assuming that the two light fluxes are respectively introduced into the first irradiation area and the second irradiation area of the reflection type liquid crystal display panel 31B, light is not sufficiently introduced into the boundary between the first irradiation area and the second irradiation area so that a dark line may, in some cases, appear at the center of the panel.

A perspective view of FIG. 7 illustrates a projection type video display comprising a mechanism for canceling the above-mentioned dark line. In a configuration shown in FIG. 7, condenser lenses 21A and 21B are respectively provided on the light output side of output-side lens arrays 41*b* and 42*b* in the first and second integrator lenses 41 and 42, and are individually provided such that the movements thereof are respectively adjustable in directions perpendicular to their optical axes. The direction perpendicular to the optical axis is a direction perpendicular to the optical function surface. Although a mechanism for moving each of the condenser lenses 21A and 21B can be realized by constituent elements such as a lens supporting frame, a guide for guiding the lens supporting frame, and a screw member for pushing and pulling the lens supporting frame along the guide, the present invention is not limited to such a mechanism. Further, a portion between the condenser lenses 21A and 21B is shaded.

Furthermore, the first integrator lens 41 and the condenser lens 21A are integrated to form a set, and the second integrator lens 42 and the condenser lens 21B are integrated to form a set. The positions of the sets can be individually shifted. Although a mechanism for shifting the position of each of the sets can be realized by constituent elements such as a frame for supporting each set, a guide for guiding the frame for supporting each set, and a screw member for pushing and pulling the frame for supporting each set along the guide, the present invention is not limited to such a mechanism.

Irradiation areas on the liquid crystal display panel by the sets are respectively made slightly larger than the first and second irradiation areas. Since the irradiation areas are respectively made slightly larger than the first and second irradiation areas, the irradiation of the first and second irradiation areas can be maintained even if the positions of the respective sets are shifted. In addition thereto, a non-irradiation area can be prevented from appearing in the boundary therebetween. These circumstances will be described on the basis of FIG. 8. The irradiation area is shifted (the position thereof is shifted), so that the irradiation area on the panel is enlarged, as indicated by ② from an irradiated state indicated by ① in FIG. 8. Accordingly, the amount of irradiated light onto the center of the panel is increased so that the dark line at the center is removed.

Only by shifting the irradiation area (shifting the position thereof), the light flux crosses the second optical function surface 50*b*, as indicated by ② in FIG. 8. At this time, each of the condenser lenses 21A and 21B is moved, as shown in FIG. 7, so that the angle of incidence of the light flux can be increased (refraction increases toward the periphery of the lens), thereby making it possible to prevent the light flux from crossing the optical function surface 50*b*, as indicated by ③ in FIG. 8.

In the configuration shown in FIG. 6 (the configuration using the two integrator lenses), lights (secondary lights), out of lights emitted from the one convex lens in the lens array 42*a*, introduced into the convex lenses other than the corresponding convex lens in the lens array 42*b* cannot cross the second optical function surface 50*b* in the color separating and mixing element 50, to be introduced into the reflection type liquid crystal display panel 31B, for example, as indicated by a dotted line in FIG. 6, thereby making it impossible to reliably prevent the double image from being produced.

Figure 10:
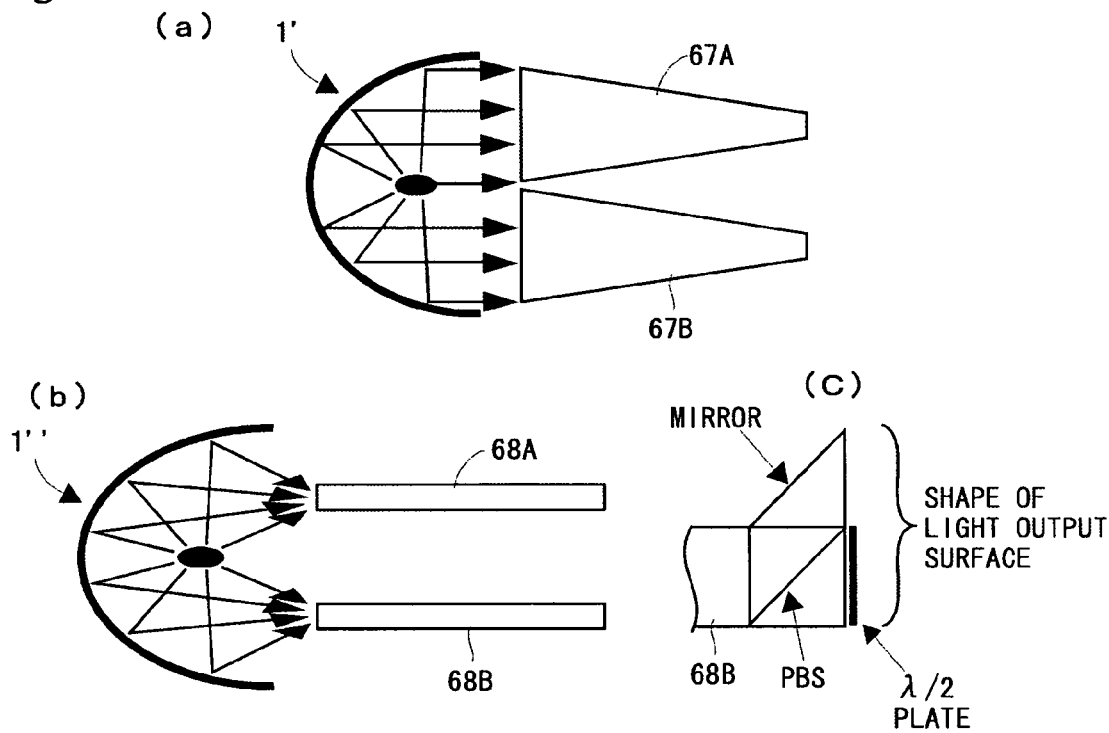
FIG. 10, consisting of FIGS. 10(a), 10(b), and 10(c), is an explanatory view showing the outline of another optical system for a reflection type liquid crystal projector in plan view according to the present invention and an example of conversion of polarized light.
Figure 11:
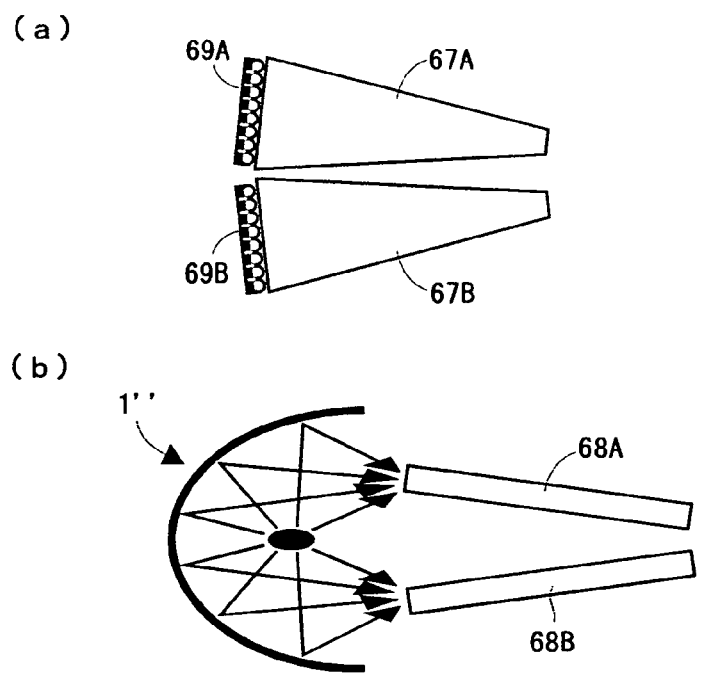
FIG. 11, consisting of FIGS. 11(a) and 11(b), is a plan view showing the outline of another optical system for the reflection type liquid crystal projector according to the present invention.
Figure 12:
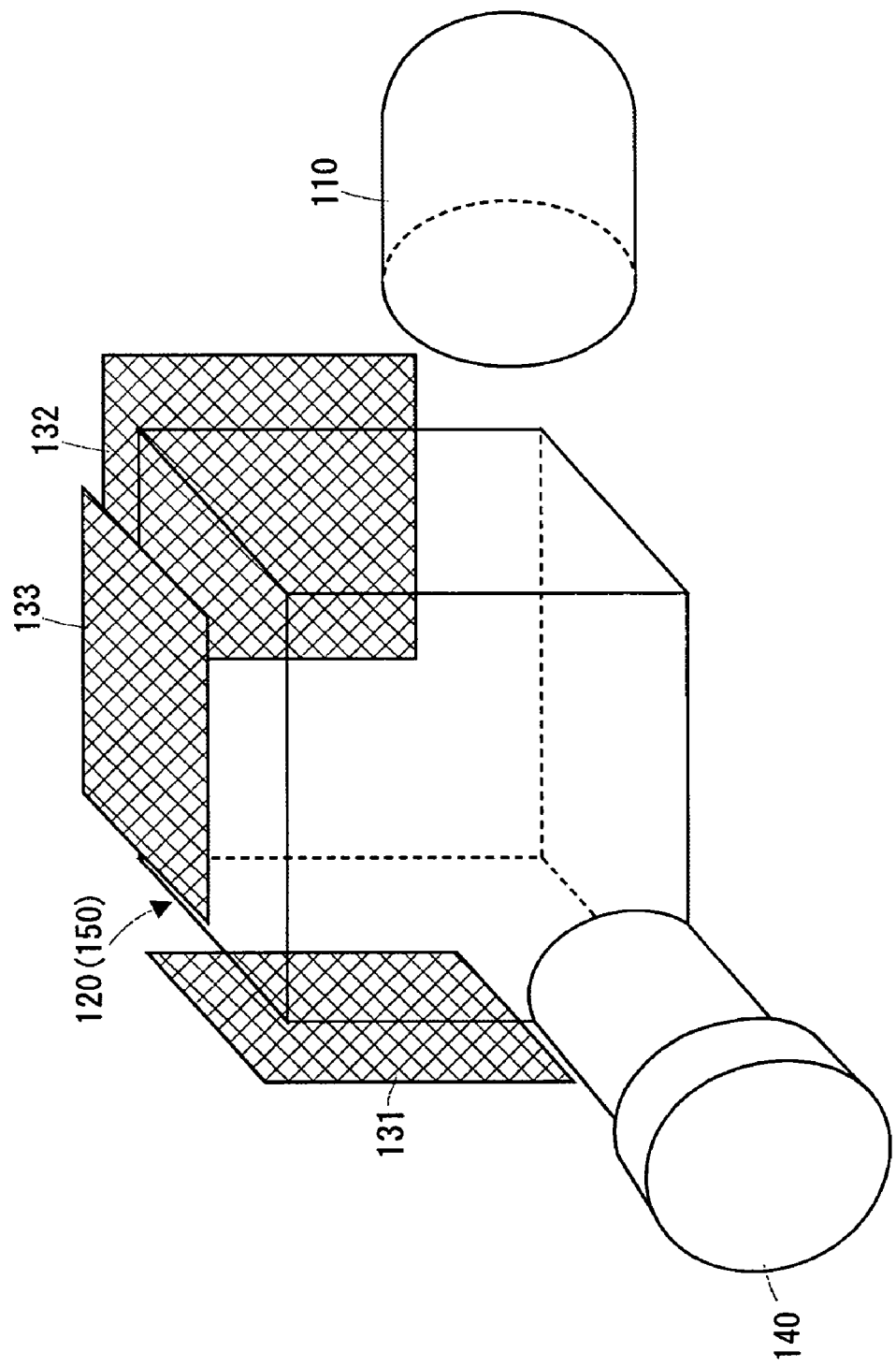
FIG. 12 is a perspective view showing the outline of an optical system for a reflection type liquid crystal projector having a conventional color separating and mixing element.
Figure 13:
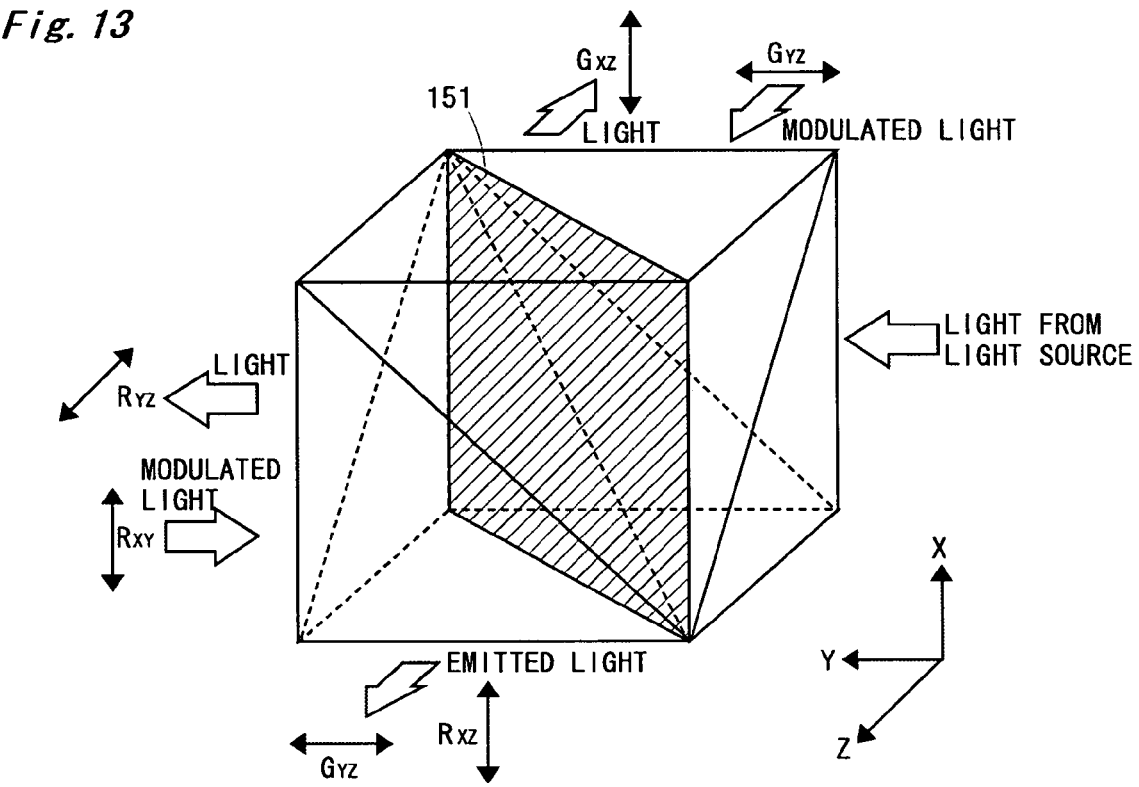
FIG. 13 is an explanatory view showing a conventional color separating and mixing element.
Figure 14:
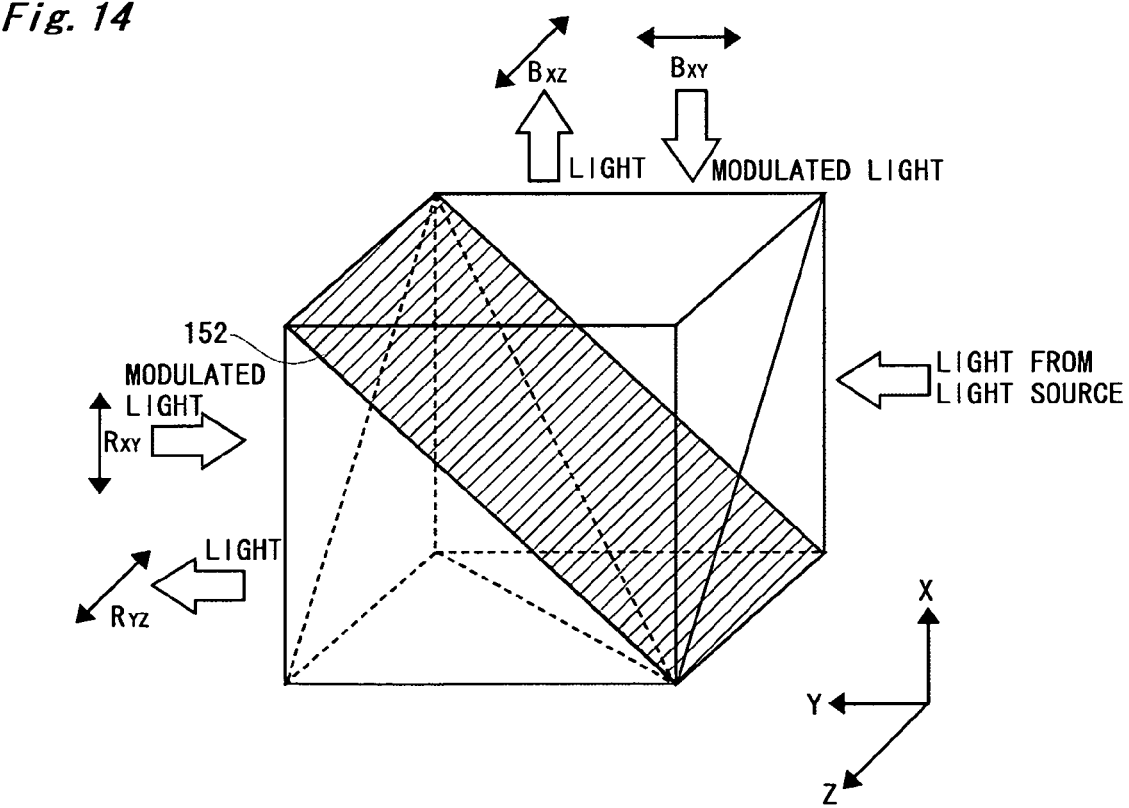
FIG. 14 is an explanatory view showing a conventional color separating and mixing element.
Figure 15:
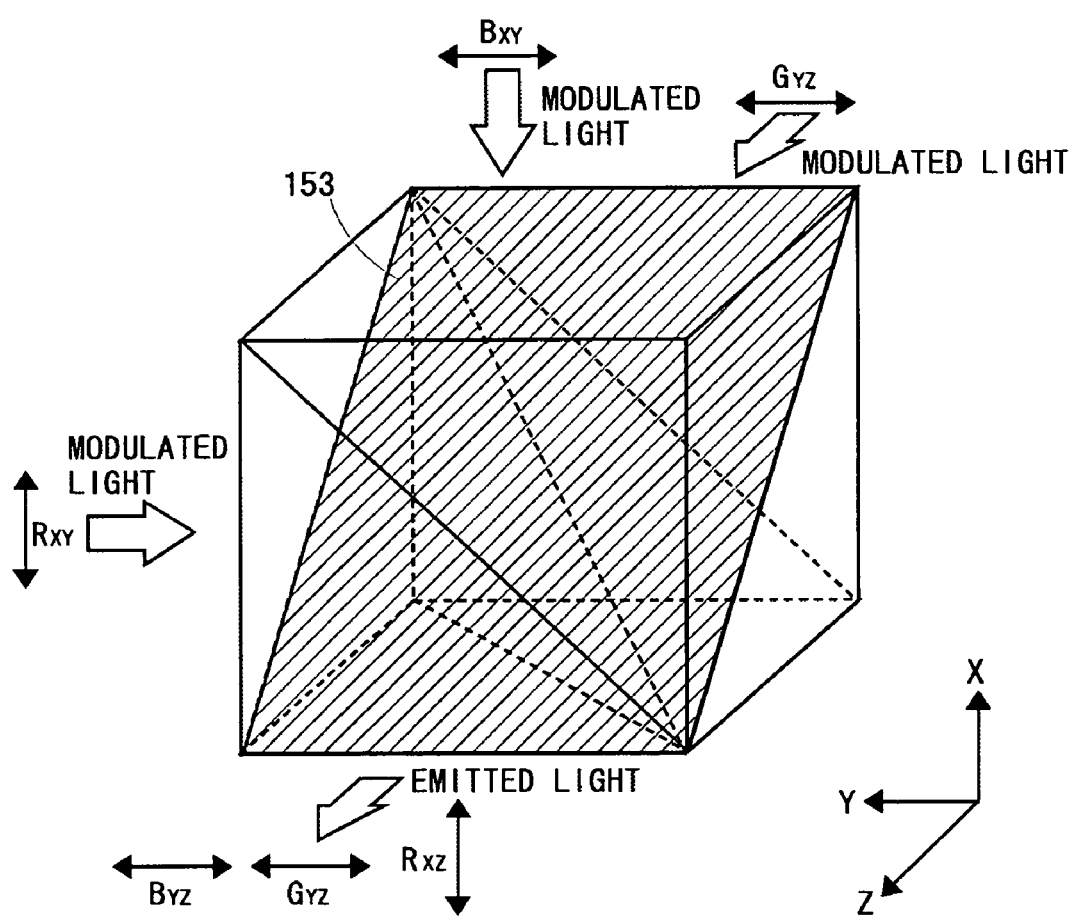
FIG. 15 is an explanatory view showing a conventional color separating and mixing element.

A configuration capable of overcoming the disadvantages which occur in the configuration shown in FIG. 6 or the like will be then described on the basis of FIGS. 9 to 11.

FIG. 9 is an explanatory view showing the outline of an optical system for a reflection type liquid crystal projector. In FIG. 9, a color light separation optical system for not only blue light but also yellow light and its light guiding system are also illustrated.

On the light output side of a light source 1, a first light flux producer 62 for producing a first light flux and a second light flux producer 63 for producing a second light flux are arranged. The first light flux producer 62 comprises a condenser lens 62*a*, a rod integrator 62*b*, and a pair of lenses 62*c* nd 62*d*. On the other hand, the second light flux producer 63 comprises a condenser lens 63*a*, a rod integrator 63*b*, and a pair of lenses 63*c* and 63*d*. Since the first light flux producer 62 and the second light flux producer 63 have the same configuration, the first light flux producer 62 will be mainly described.

The condenser lens 62*a* is arranged by occupying the half of a light output area of the light source 1, and is obtained by cutting a circular lens larger than the half of the area in conformity with the half of the area. The center of an optical axis of the condenser lens 62a is at a position intermediate between the center of the optical axis of the light source 1 and an edge of the light source 1. Light condensed by the condenser lens 62a is incident on a light incidence end surface of the rod integrator 62b. Light incident on the rod integrator 62b is repeatedly reflected inside the rod integrator 62b, and is emitted from an output surface of the rod integrator 62b. The shapes of the end surfaces on the output side of the rod integrators 62b and 63b are similar to the shapes of the first and second irradiation areas.

The pair of lenses 62c and 62d corresponds to a pair of lenses in a pair of fly's eye lenses. Light passing through the incidence-side lens 62c is focused in the vicinity of the output-side lens 62d, and light emitted from the output-side lens 62d is refracted by a condenser lens 65A and condenser lenses 66A and 66B, and is introduced into a first area of the reflection type liquid crystal display panel 31 in such a manner as to cross the optical function surface in the color separating and mixing element 50. Similarly, the pair of lenses 63c and 63d corresponds to a pair of lenses in a pair of fly's eye lenses. Light passing through the incidence-side lens 63c is focused in the vicinity of the output-side lens 63d, and light emitted from the output-side lens 63d is refracted by a condenser lens 65B and the condenser lenses 66A and 66B, and is introduced into a second area of the reflection type liquid crystal display panel 31 in such a manner as to cross the optical function surface in the color separating and mixing element 50. The condenser lenses 66A and 66B exist as a simple substance (a common for the first and second light fluxes) at a position on the light incidence side of the color separating and mixing element 50, and receives two light fluxes which arrive in a crossing shape to refract the light fluxes.

The output-side lens 62d in the pair of lenses 62c and 62d and the output-side lens 63d in the pair of lenses 63c and 63d are respectively mounted on openings formed in a shading plate 64, and prevent lights other than lights passing through the lenses from being introduced into the reflection type liquid crystal display panel 31.

The light from the light source 1 is thus completely separated into independent two light fluxes, respectively, by the first light flux producer 62 and the second light flux producer 63. The two light fluxes cross each other on the optical function surface in the color separating and mixing element 50, and are respectively introduced into the first irradiation area and the second irradiation area of the reflection type liquid crystal display panel 31. That is, reflected light modulated by the reflection type liquid crystal display panel 31 is reflected in a direction away from the optical function surface in the color separating and mixing element 50, not to cross the optical function surface in the color separating and mixing element 50. Accordingly, a double image is prevented from being formed by total reflection and transmission on the optical function surface in the color separating and mixing element 50. Further, light is not changed into two light fluxes using a pair of integrator lenses each composed of a lot of pairs of convex lenses, as shown in FIG. 6, and the two light fluxes are completely separated by the two rod integrators, thereby reliably preventing the double image.

In a projection type video display shown in FIG. 10(a), a light source 1' comprises a parabolic reflector, and emits approximately parallel lights. The shape of an opening on the light output side of the light source 1' is set to an approximately square shape (similar to an aspect ratio in a liquid crystal display panel 31), the half thereof (corresponding to first and second irradiation areas of the liquid crystal display panel 31) being occupied to position a light incidence end surface of a first rod integrator 67A, and the other half thereof being occupied to position a light incidence end surface of a second rod integrator 67B. The sizes of output surfaces of the first and second rod integrators 67A and 67B and the positional relationship therebetween are the same as the sizes of the output surfaces of the rod integrators 62b and 63b and the positional relationship therebetween shown in FIG. 9. Further, the same configuration as that shown in FIG. 9 is applicable to an optical system in a stage succeeding output surfaces of the first and second rod integrators 67A and 67B.

In the configuration shown in FIG. 10(a), the necessity of the condenser lenses 62a and 63a shown in FIG. 9 can be eliminated, thereby reducing the number of parts in an optical system.

In a projection type video display shown in FIG. 10(b), a light source 1" comprises a two-focuses elliptic reflector. The two-focuses elliptic reflector is so configured that two light converging points can be formed with respect to one light emitting point, and has a first elliptic reflector area where a first light converging point is formed from one light emitting point and a second elliptic reflector area where a second light converging point is formed from the one light emitting point, for example. A light incidence end surface of a first rod integrator 68A is positioned at the first light converging point, and a light incidence end surface of a second rod integrator 68B is positioned at the second light converging point. The arrangement relationship between the first and second rod integrators 68A and 68B is the same as the arrangement relationship between the rod integrators 62b and 63b shown in FIG. 9. Further, the same configuration as that shown in FIG. 9 is applicable to an optical system in a stage succeeding output surfaces of the first and second rod integrators 68A and 68B.

In the configuration shown in FIG. 10(b), the necessity of the condenser lenses 62a and 63a shown in FIG. 9 can be eliminated, thereby reducing the number of parts in an optical system. Although the cone angle of light fluxes which have been emitted from each of the rod integrators 67A and 67B is increased because its output surface is smaller than its light incidence end surface in the configuration shown in FIG. 10(a), the sizes of the light incidence end surface and the output surface of the rod integrator are made the same, thereby making it possible to prevent the cone angle from being enlarged in the configuration shown in FIG. 10(b).

A reflector may be provided in an area other than the positions of two light converging points in the light source 1", to return unnecessary light toward the light source 1" to achieve effective utilization of light. Further, predetermined polarized light is introduced into the color separating and mixing element 50. A polarization conversion system used therefor may be provided on the output surface of the rod integrator, as shown in FIG. 10(c), rather than being provided on the light incidence side of the rod integrator. Of course, the polarization conversion system may be arranged on an optical path in a stage succeeding the output surface of the rod integrator, it is desirably arranged at a position short of the light incidence side of the dichroic mirror 6. The polarization conversion system shown in FIG. 10(c) is composed of a polarizing beam splitter (hereinafter referred to as PBS). The PBS comprises a polarized light separating surface and a retardation plate (½λ plate). The polarized light separating surface in the PBS passes P-polarized light and changes the optical path of S-polarized light by 90°, for example, in the incident light. The S-polarized light whose optical path has been changed is reflected by an adjacent total reflection mirror (which may be a prism) and is emitted. On the other hand, the P-polarized light which has passed through the polarized light separating surface is converted into S-polarized light by the retardation plate (½λ plate) provided on the front side (on the light exit side) and is emitted. That is, in this example, almost all lights are converted into S-polarized lights.

In a projection type video display shown in FIG. 11(a), first and second rod integrators 67A and 67B are arranged such that their optical axes (center lines) cross each other. The crossing arrangement of the optical axes makes it possible to eliminate the necessary of the condenser lens 65 for crossing and refraction shown in FIG. 9. Light sources 69A and 69B each composed of solid-state light emitting elements (e.g., LEDs (light emitting diodes)) arranged in an array shape are respectively provided on light incidence end surfaces of the rod integrators 67A and 67B. Although the intensity distribution of lights from the light sources 69A and 69B is nonuniform due to the array-shaped arrangement, the lights are superimposed (integrated) by passing through the rod integrators 67A and 67B, and the lights whose intensity distribution is made uniform are respectively emitted from output surfaces of the rod integrators 67A and 67B.

In a projection type video display shown in FIG. 11(b), a light incidence end surface of a first rod integrator 68A is positioned at a first light converging point of a light source 1", and a light incidence end surface of a second rod integrator 68B is positioned at a second light converging point. The first and second rod integrators 68A and 68B are arranged such that their optical axes (center lines) cross each other. The crossing arrangement of the optical axes makes it possible to eliminate the necessary of the condenser lens 65 for crossing and refraction shown in FIG. 9.

In a configuration other than the configuration shown in FIG. 11(a), a solid-state light source (an LED, a semiconductor laser, etc.) may be also used.

As described in the foregoing, the color separating and mixing element according to the present invention has two optical function surfaces formed in its cubic shape, which is a simple configuration comprising a combination of four optical parts. Therefore, the manufacture thereof is easier than that of a conventional configuration comprising six tetrahedrons, and an optical function surface for reflecting video light so as to twist the video light is eliminated, thereby making it possible to also avoid a reduction in contrast. In a video light producing device having a configuration in which lights are introduced so as to cross each other on an optical function surface, a double image can be reliably prevented from being produced. If a configuration using two rod integrators is used as the configuration in which lights are introduced so as to cross each other on an optical function surface, the double image can be reliably prevented from being produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color separating and mixing element comprising, in its transparent cube, a first optical function surface and a second optical function surface which are unparallel to each other, first and second faces of the cube being respectively taken as light incidence surfaces, third, fourth and fifth faces of the cube being respectively taken as light incidence/output surfaces, and a sixth face of the cube being taken as a light output surface, said first optical function surface having the functions of transmitting first color light in the primary color which is predetermined polarized light and reflecting said first color light in the primary color which differs from said predetermined polarized light by 90° in the direction of polarization, said second optical function surface having the functions of transmitting second color light in the primary color which is predetermined polarized light and reflecting said second color light in the primary color which differs from said predetermined polarized light by 90° in the direction of polarization, and the functions of reflecting third color light in the primary color which is predetermined polarized light-and reflecting said third color light in the primary color which differs from said predetermined polarized light by 90° in the direction of polarization, said first color light in the primary color which is predetermined polarized light incident on the first face of said cube passing through the first optical function surface and being emitted from the third face of the cube, said first color light in the primary color returned after the direction of polarization thereof is rotated by 90° being received in the third face of the cube, and the first color light in the primary color being reflected by the first optical function surface and being emitted from said light output surface, said second color light in the primary color which is predetermined light incident on the second face of said cube passing through the second optical function surface and being emitted from the fourth face of the cube, said second color light in the primary color returned after the direction of polarization thereof is rotated by 90° being received in the fourth face of the cube, and the second color light in the primary color being reflected by the second optical function surface and being emitted from said light output surface, and said third color light in the primary color which is predetermined light incident on the second face of said cube being reflected by the second optical function surface and being emitted from the fifth face of the cube, said third color light in the primary color returned after the direction of polarization thereof is rotated by 90° being received in the fifth face of the cube, and the third color light in the primary color passing through the second optical function surface and being emitted from said light output surface.

2. A video light producing device comprising:

the color separating and mixing element according to claim 1;

three reflection type light modulating elements respectively provided on the side of the third, fourth and fifth faces of the cube of the color separating and mixing element;

a light source for emitting white light;

separation means for separating the white light emitted from said light source into one light in the primary color and two lights in the primary colors which are predetermined polarized lights; and narrow-band retardation means for rotating the direction of polarization of one of said two lights in the primary colors by 90°.

3. The video light producing device according to claim 2, wherein
the light source or the light source portion comprises solid-state light emission means.

4. The video light producing device according to claim 2, wherein
polarization conversion means for converting the direction of polarization of the incident light.

5. The video light producing device according to claim 2, wherein
the light from the light source is changed into two light fluxes, and
the two light fluxes cross each other on the optical function surface and are respectively introduced into a first irradiation area and a second irradiation area of the predetermined reflection type light modulating element.

6. The video light producing device according to claim 5, comprising
a first integrator lens comprising an incidence-side lens array and an output-side lens array such that each of convex lenses introduces the light from said light source into the first irradiation area of said reflection type light modulating element, and
a second integrator lens comprising an incidence-side lens array and an output-side lens array such that each of convex lenses introduces the light from said light source into the second irradiation area of said reflection type light modulating element.

7. The video light producing device according to claim 6, wherein
condenser lenses are respectively provided on the light output side of the output-side lens arrays, and
each of the condenser lenses is provided such that the movement thereof is adjustable in a direction perpendicular to its optical axis so that the angle of irradiation of the light flux can be adjusted.

8. The video light producing device according to claim 6, wherein
condenser lenses are respectively provided on the light output side of the output-side lens arrays, to form pairs of integrator lenses and corresponding condenser lenses, and
the pairs are provided such that the positions thereof can be individually shifted so that an operation for shifting the position where the irradiation of the light flux is started can be performed.

9. The video light producing device according to claim 5, comprising
a mechanism for adjusting the angle of irradiation of the light flux.

10. The video light producing device according to claim 5, comprising
a mechanism for shifting the position where the irradiation of the light flux is started.

11. The video light producing device according to claim 5, wherein the light from the light source is changed into two light fluxes by two rod integrators.

12. The video light producing device according to claim 11, wherein
there is provided a light source comprising a reflector in the shape of a curved surface, and
approximately parallel lights from said light source are condensed, and are respectively introduced into light incidence surfaces of said two rod integrators.

13. The video light producing device according to claim 11, wherein there is provided a light source comprising a reflector for forming two light converging points from one light emitting point, and
light incidence surfaces of said two rod integrators are respectively arranged in the vicinity of the positions of the two light converging points of said light source.

14. The video light producing device according to claim 11, wherein
there are provided two light sources, and
lights from the light sources are respectively introduced into light incidence surfaces of said two rod integrators.

15. The video light producing device according to claim 11, wherein
a single optical element is provided at a position on the light incidence side of said color separating and mixing element, and
the two light fluxes which arrive in a crossing shape are refracted by said optical element.

16. The video light producing device according to claim 11, wherein
an optical system arranged on the light output side in each of said two rod integrators comprises at least a first optical element for condensing light emitted from the rod integrator and a second optical element arranged in the vicinity of a light converging point of the first optical element.

17. The video light producing device according to claim 16, wherein
said two rod integrators are arranged parallel to each other, and
said optical system comprises a third optical element for refracting lights passing through said second optical element and making the refracted lights cross each other.

18. The video light producing device according to claim 16, wherein
said two rod integrators are arranged unparallel to each other, and
lights passing through said second optical element cross each other.

19. The video light producing device according to claim 5, wherein
letting A:B be an aspect ratio in the reflection type light modulating element,
each of the first irradiation area and the second irradiation area is divided at a ratio of A:B/2.

20. The video light producing device according to claim 2, wherein
the light source, the color separating and mixing element, and the optical element leading to the color separating and mixing element from the light source are unitized.

21. A video light producing device comprising:
the color separating and mixing element according to claim 1;
three reflection type light modulating elements respectively provided on the side of the third, fourth and fifth faces of the cube of the color separating and mixing element;
a first light source portion for emitting one light in the primary color which is predetermined polarized light; and
a second light source portion for emitting two lights in the primary colors which differ from each other by 90° in the direction of polarization.

22. The video light producing device according to claim 21, wherein said second light source portion comprises narrow-band retardation means for rotating the direction of polarization of one of the two lights in the primary colors by 90°.

23. The video light producing device according to claim 21, wherein
said second light source portion comprises two light sources for respectively emitting two lights in the primary colors which differ from each other by 90° in the direction of polarization, and
mixing means for receiving and mixing said two lights in the primary colors.

24. The video light producing device according to claim 21, wherein
the light source or the light source portion comprises solid-state light emission means.

25. The video light producing device according to claim 21, wherein
polarization conversion means for converting the direction of polarization of the incident light.

26. The video light producing device according to claim 21, wherein
the light from the light source is changed into two light fluxes, and
the two light fluxes cross each other on the optical function surface and are respectively introduced into a first irradiation area and a second irradiation area of the predetermined reflection type light modulating element.

27. The video light producing device according to claim 26, comprising
a first integrator lens comprising an incidence-side lens array and an output-side lens array such that each of convex lenses introduces the light from said light source into the first irradiation area of said reflection type light modulating element, and
a second integrator lens comprising an incidence-side lens array and an output-side lens array such that each of convex lenses introduces the light from said light source into the second irradiation area of said reflection type light modulating element.

28. The video light producing device according to claim 27, wherein
condenser lenses are respectively provided on the light output side of the output-side lens arrays, and
each of the condenser lenses is provided such that the movement thereof is adjustable in a direction perpendicular to its optical axis so that the angle of irradiation of the light flux can be adjusted.

29. The video light producing device according to claim 27, wherein
condenser lenses are respectively provided on the light output side of the output-side lens arrays, to form pairs of integrator lenses and corresponding condenser lenses, and
the pairs are provided such that the positions thereof can be individually shifted so that an operation for shifting the position where the irradiation of the light flux is started can be performed.

30. The video light producing device according to claim 26, comprising
a mechanism for adjusting the angle of irradiation of the light flux.

31. The video light producing device according to claim 26, comprising
a mechanism for shifting the position where the irradiation of the light flux is started.

32. The video light producing device according to claim 26, wherein
the light from the light source is changed into two light fluxes by two rod integrators.

33. The video light producing device according to claim 32, wherein
there is provided a light source comprising a reflector in the shape of a curved surface, and
approximately parallel lights from said light source are condensed, and are respectively introduced into light incidence surfaces of said two rod integrators.

34. The video light producing device according to claim 32, wherein
there is provided a light source comprising a reflector for forming two light converging points from one light emitting point, and
light incidence surfaces of said two rod integrators are respectively arranged in the vicinity of the positions of the two light converging points of said light source.

35. The video light producing device according to claim 32, wherein
there are provided two light sources, and
lights from the light sources are respectively introduced into light incidence surfaces of said two rod integrators.

36. The video light producing device according to claim 32, wherein
a single optical element is provided at a position on the light incidence side of said color separating and mixing element, and
the two light fluxes which arrive in a crossing shape are refracted by said optical element.

37. The video light producing device according to claim 32, wherein
an optical system arranged on the light output side in each of said two rod integrators comprises at least a first optical element for condensing light emitted from the rod integrator and a second optical element arranged in the vicinity of a light converging point of the first optical element.

38. The video light producing device according to claim 37, wherein
said two rod integrators are arranged parallel to each other, and
said optical system comprises a third optical element for refracting lights passing through said second optical element and making the refracted lights cross each other.

39. The video light producing device according to claim 37, wherein
said two rod integrators are arranged unparallel to each other, and
lights passing through said second optical element cross each other.

40. The video light producing device according to claim 26, wherein
letting A:B be an aspect ratio in the reflection type light modulating element,
each of the first irradiation area and the second irradiation area is divided at a ratio of A:B/2.

41. The video light producing device according to claim 21, wherein
the light source, the color separating and mixing element, and the optical element leading to the color separating and mixing element from the light source are unitized.

42. A projection type video display comprising the video light producing device according to any one of claims 2 to 41.

* * * * *